Figure 1:
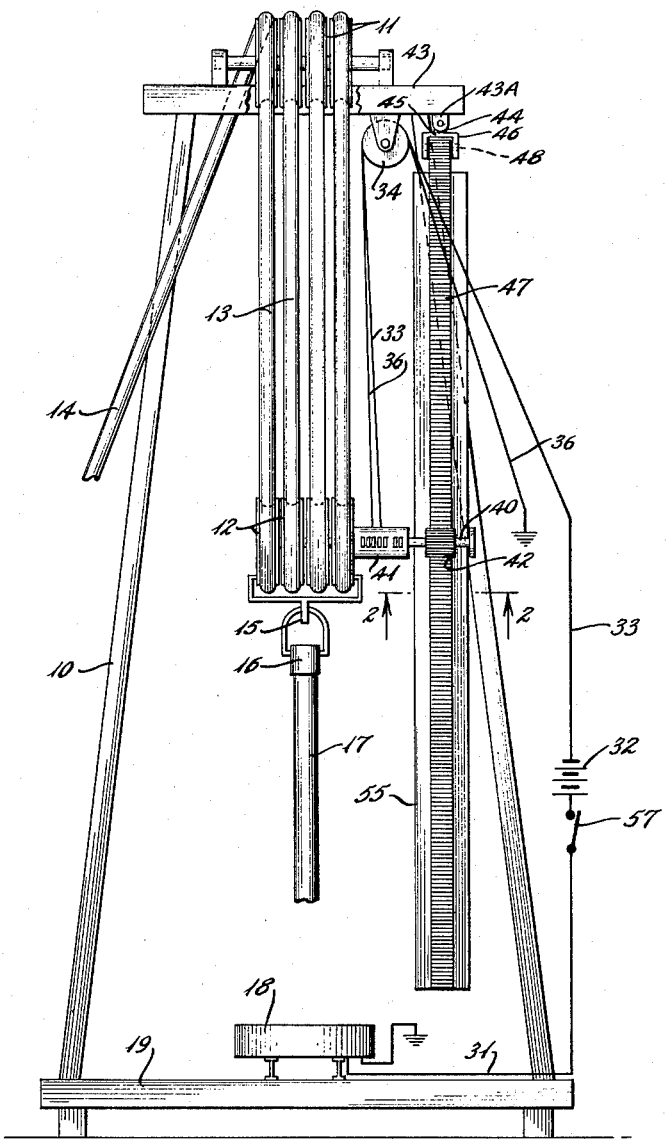

Oct. 24, 1961 C. S. SHAFFER 3,005,264
DEPTH REGISTER
Filed July 28, 1958 3 Sheets-Sheet 2
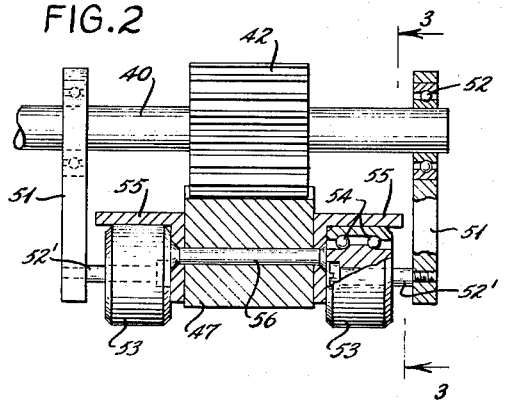
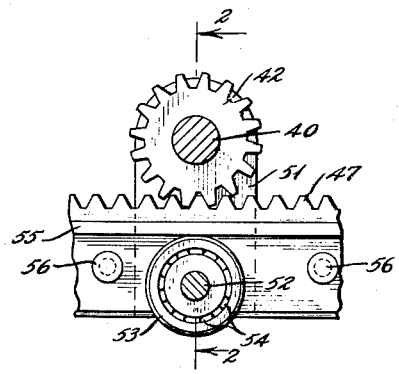
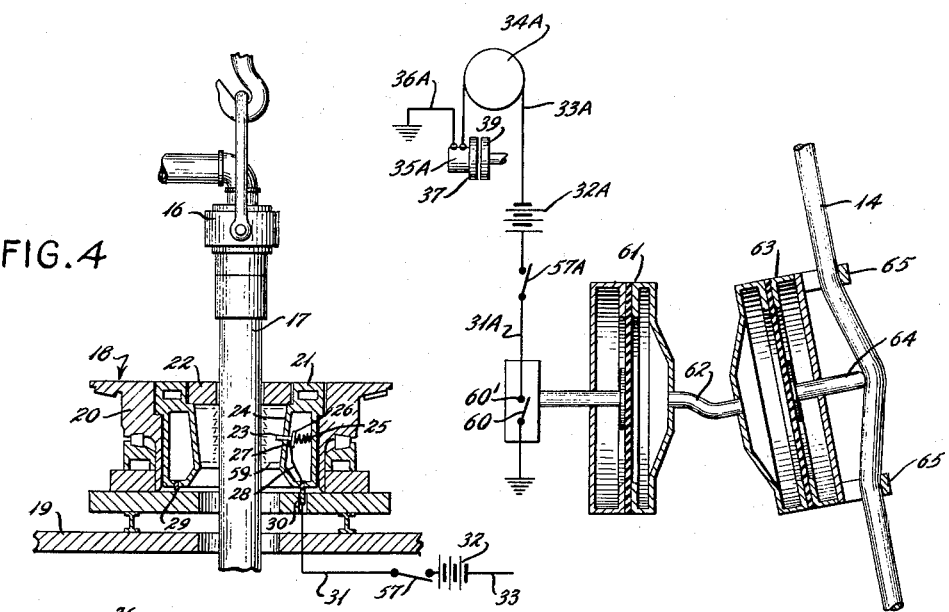
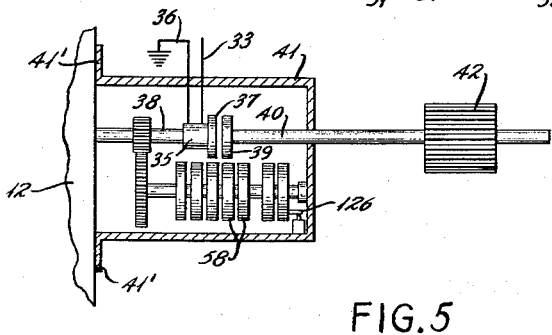
INVENTOR
C. S. SHAFFER
BY
ATTORNEY Oct. 24, 1961  C. S. SHAFFER  3,005,264
DEPTH REGISTER
Filed July 28, 1958  3 Sheets-Sheet 3
FIG. 7
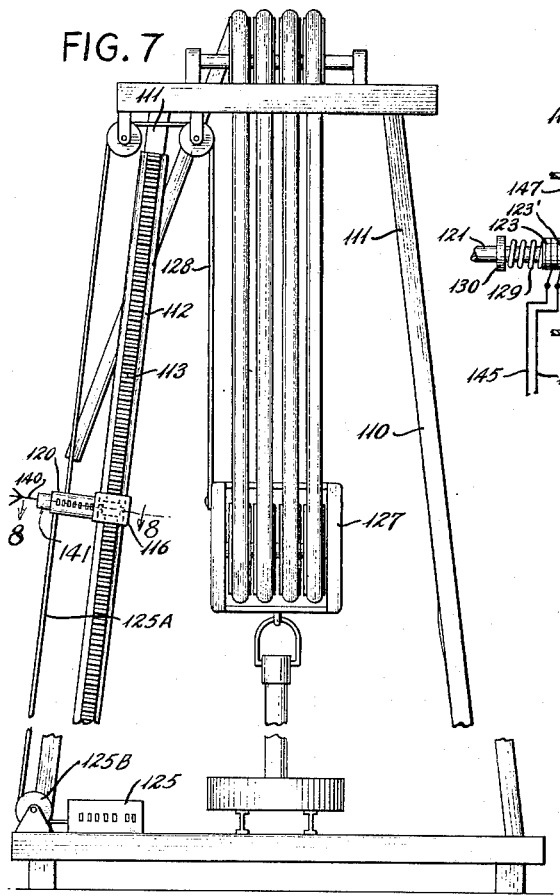
FIG. 8
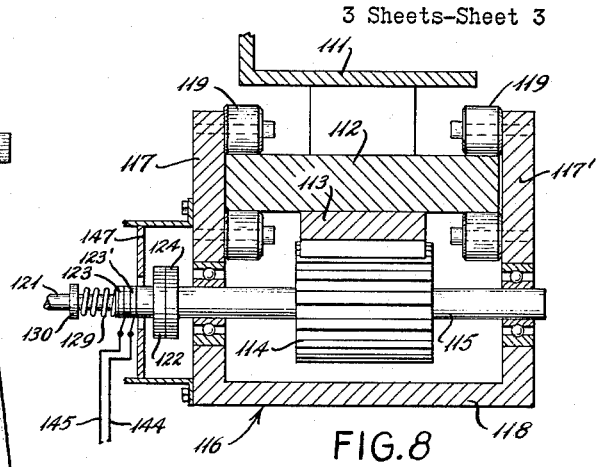
FIG. 9
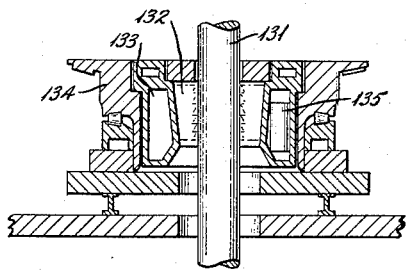
FIG. 10
FIG. 11
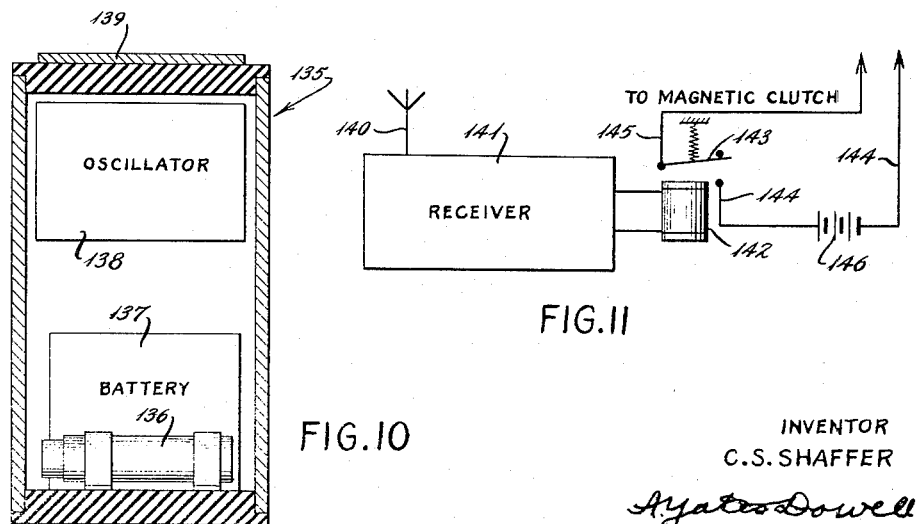
INVENTOR
C.S. SHAFFER
BY A. Yates Dowell
ATTORNEY

United States Patent Office 3,005,264
Patented Oct. 24, 1961

3,005,264
DEPTH REGISTER
Charles S. Shaffer, Box 1017, Lubbock, Tex.
Filed July 28, 1958, Ser. No. 751,217
7 Claims. (Cl. 33—141)

The present invention relates to apparatus and a method for accurately measuring the depth of a well in the process of drilling a well without requiring removal of the well string.

Heretofore various devices have been designed to measure the depth of wells including devices to measure the length of the string of hollow drill pipe which support and rotate the cutter at the bottom of the well but the prior devices have not been entirely satisfactory because they have not been sufficiently accurate to assure precise measurements. This difficulty is particularly acute where the depth of oil bearing strata is shallow such as six feet deep when the well is 10,000 feet deep. A very slight error may result in completely penetrating the oil bearing strata thereby rendering the well useless or requiring great expense to cement portions of the well to obtain production of oil.

An object of the present invention is to provide a device which will accurately measure the string of drill pipe, casing or tubing while the drill pipe, casing or tubing is subject to the tensile stress and strain of the weight of the string of drill pipe, casing or tubing and the cutter and to make proper allowance for the withdrawal of a section of drill pipe, casing or tubing and the addition of drill pipes, casing or tubing even though the sections are of varying lengths.

A further object is to provide a positive measurement of the length of the drill pipe, casing or tubing as the drill, pipe, casing or tubing is lengthened or shortened.

Another object is to provide a positive gear connection between the measuring elements to obtain accurate positive measurements of the well string and thereby of the well.

Other and further objects will be apparent as the description proceeds and upon reference to the accompanying drawings wherein:

FIG. 1 diagrammatically illustrates a derrick with the usual pulley system of fixed and movable pulley blocks for raising a string of drill pipe, casing or tubing and for adding sections of drill pipe casing or tubing and showing the rack and pinion arrangement of the present invention in parallel relation to the pulley system and with an indicator, register, or counter carried by the movable pulley block;

FIG. 2, a section taken on line 2—2 of FIGS. 1 and 3 showing the connection of the pinion and the rack;

FIG. 3, a section taken substantially on line 3—3 of FIG. 2 showing the rack and pinion gear held in meshing relation by rollers engaging angle tracks;

FIG. 4, an enlarged fragmentary detail showing the rotary table with the rotary bushing therein and illustrating in dotted lines the position of slips to retain the drill string and showing the switch in closed position;

FIG. 5, a fragmentary detail of the housing for the counter and an electrically actuated clutch for operating the counter;

FIG. 6, a fragmentary detail of an alternative structure responsive to tension in the dead line of the pulley block system for actuating the switch and the electrically operated clutch;

FIG. 7, a modified form of the invention with the rack gear fixed to one of the upright supports for the derrick;

FIG. 8, an enlarged transverse section taken substantially on line 8—8 of FIG. 7 and showing the movement of the pinion and the counter housing on the rack gear;

FIG. 9, a fragmentary sectional view through the slip bowl similar to FIG. 4 showing a modified switch mechanism for operating the counter clutch;

FIG. 10, an enlarged view of the switch assembly and radio oscillator for transmitting signals to operate the magnetic clutch for drivingly engaging the driving pinion and the counter; and FIG. 11, a schematic diagram of the radio receiver operated by the switch structure shown in FIG. 10.

Briefly stated, the present invention comprises an apparatus and method for measuring the length of the string of drill pipes of a well and thereby the depth of a well and comprises a counter mounted on the movable pulley block of a conventional derrick. A positive electric clutch connects the indicator, counter, or register to a projecting portion of a shaft on which a pinion is fixed and such pinion meshes with a rack gear swivelly and universally suspended from the upper portion of the derrick adjacent the fixed pulley block. As the movable pulley block is raised or lowered, the pinion gear moves along the rack and is rotated. The counter is actuated only when the drill string is in position and is being raised or lowered, the clutch being engaged at such times only, to measure the amount of penetration and/or the extent of removal of the drill string. The clutch is actuated by a source of electric power which may be controlled by the tension in the dead line of the cable reeved through the pulley blocks or by the presence of the tubular square shaft or kelly for rotating the drill string from the usual rotary table. A preferred modification of the invention provides for operation of the clutch by a radio control structure responsive to the presence of the slip in a slip bowl.

An alternative form of the invention includes a stationary rack gear fixed to an upright of a conventional derrick. A flexible non-stretchable cord extends from the movable pulley block of the derrick around a fixed pulley at the top of the derrick to a slide carrying a pinion and a length indicator or counter with the slide movable along the rack. A clutch between the pinion and the counter is operated in response to a radio transmitter in the slip bowl of the rotary drive of the well drilling equipment, the radio transmitter being operative in response to the presence of the conventional slips in the slip bowl. An additional counter may be mounted on the fixed support of the derrick and operated from the movable counter by suitable electrical connection. The operation of the several modifications is similar and accurately registers the length of the drill string, casing or tubing which has been placed in the well.

Referring more particularly to the drawings, a derrick 10 is provided at its upper end with a fixed pulley block 11 which supports a movable pulley block 12 by means of a cable 13 having a dead end 14 connected to a winch or the like (not shown) for operating the same. The movable pulley block carries a conventional hook 15 which engages a conventional swivel 16 connected to the usual tubular square driving shaft or kelly 17 which in turn is connected to one or more sections of drill pipe and thereby to a conventional drill or cutter (not shown). A conventional rotary table 18 is mounted on the floor 19 of the derrick (FIGS. 1 and 4), such rotary table including a cylinder 20 having usual driving teeth and being rotatably supported on suitable bearings in a conventional manner and carrying the hollow master bushing 21 which in turn carries the square rotary bushing 22 which drives the kelly 17 in a well-known manner. A contact pin 23 extends through the slip bowl 24 and has its inner end normally urged inwardly of the tapering conical surface of the slip bowl by a spring 25 which urges the grounded contact 26 fixed to the pin 23 into circuit closing relation with an insulated contact 27 which is connected by a lead 28 to a slip ring 29 which slip ring engages a spring pressed contact 30 connected to a lead 31 which is connected to a manually operable switch 57 which is connected to a battery 32 or other source of electric power.

From the battery 32 a lead 33 extends through a suitable take-up mechanism of any conventional type such as a windlass with slip rings or the like and passes over a pulley 34 at the upper end of the derrick and such lead 33 extends to one terminal of an electromagnetic clutch, the other terminal of electromagnetic clutch 35 being connected by a lead 36 to a ground to complete the circuit. One clutch face element 37 is movably mounted on a splined shaft or the like 38 which is connected to a counter of conventional design to measure the extent of rotation of such splined shaft 38. The co-operating clutch element 39 is fixed to a pinion shaft 40 rotatably mounted in the counter or indicator housing 41 and fixedly connected to a pinion gear 42. The clutch 37, 39, counter or indicator shaft 38, pinion shaft 40 and the counter or indicator are mounted in a housing or support 41 having lugs 41' or the like by means of which the housing is secured to the movable pulley block by suitable fasteners so the pinion shaft 40 and counter or indicator shaft 38 are substantially in line with the axis of movable pulley block 12. A brake may also be provided to positively retain the clutch element in fixed position when the clutch is disengaged to prevent accidental movement of the counter.

Fixed to the upper end 43 of the derrick is a yoke 43A having a pivot pin passing through a transverse bore in a swivel 44. The swivel 44 has an enlarged head 45 with a yoke 46 swivelly mounted for rotation about the axis of the swivel 44 and being retained thereon by the enlarged head 45 of the swivel. A rack gear 47 is pivotally mounted by means of a pin 48 to the yoke 46, whereby the rack gear 47 may swing in all directions in accordance with the swinging movements of the movable pulley block 12. The rack gear 47 is pivotally mounted substantially parallel to the runs of the cable between the movable pulley block 12 and the fixed pulley block 11. The pinion 42 is maintained in meshing contact with the rack 47 by means of brackets 51, 51, which are rotatably supported from the shaft 40 by means of anti-friction ball or roller bearings 52 and the free ends of brackets 51, 51 carry stub shafts 52', 52' on which rollers 53, 53 are rotatably mounted on radial and thrust anti-friction bearings 54. 54. The rollers 53, 53 engage angle tracks 55, 55 which are connected by rivets 56 to the rack 47 whereby the pinion 42 may roll over the rack 47 and be maintained in engagement with the rack by the brackets 51, stub shafts 52 and rollers 53.

An alternative means for causing operation of the clutch elements 37 and 39 is shown in FIG. 6 in which a switch 60, 60' corresponding to switch 26, 27 is actuated by a hydraulically operated diaphragm device 61 connected by a hydraulic line 62 to a second hydraulic diaphragm device 63 which has an actuating plunger 64, having its free end engaging the dead line 14 of the cable 13. A pulley or the like may be provided at the free end of plunger 64 to reduce friction as the cable moves therepast. The plunger 64 is normally spring urged toward the dead line 14 moving the dead line outwardly from alignment between guides 65, 65 through which the dead line 14 is reeved. The projected position of plunger 64 is shown in FIG. 6 so that when a small load such as a single length of drill pipe is supported on the pulley block 12, the plunger 64 will not be appreciably depressed and therefore the hydraulic fluid between diaphragm devices 63 and 61 will not have sufficient pressure to operate and close the switch 60, 60'. However, as soon as the entire drill string is supported by the pulley 12, the section of dead line between guides 65, 65 will be straightened out actuating the hydraulic devices closing the switch 60, 60' thereby resulting in engagement of the electric clutch 37, 39 through a circuit including ground wire 36A, terminals 35A, clutch coils, terminal 34A, wire 33A, battery 32A. The wiring diagram of FIG. 6 is essentially the same as that shown in FIGS. 1 and 5 with postscrip "A" applied after the corresponding reference numerals and switch 60, 60' substituted for switch 26, 27, normal switch 57A, wire 31A, fixed switch contact 60', movable contact 60 to ground.

*Operation*

From the above description it is believed that the operation of the depth measuring device should be obvious. When a well string is made up, the cutter and one or more lengths of drill pipe are connected together and supported by the hook 15 of pulley block 12 in a definite position with the cutter in a definite position known as the "measuring point" at the top of the well. A manual switch 57 may be provided in the lead 31 and when the cutter is at the measuring point the switch 57 is closed and since there are no drill pipe retaining slips 59 in the slip bowl 24, the contact pin 23 will project into the bowl, as shown in full lines in FIG. 4, closing grounded contact 26 with contact 27 and thereby through lead 28, slip ring 29, spring pressed contact pin 30, lead 31, switch 57, battery 32, lead 33, terminal 34 of the electric clutch 37, terminal 35, lead 36 to ground completing the circuit and causing the clutch to engage. The clutch elements 37 and 39 are drawn together upon completion of the circuit and any movement of pulley block 12 will cause rotation of pinion 42 along rack 47 and such rotation will be transferred through shaft 38 and suitable gearing to the indicating dials 58 thereby positively rotating the indicating dials 58 so that upon lowering of the drill string and the pulley block 12 the dials 58 will indicate the length of the drill string and thereby the depth of the well from the measuring point. It will be noted that the indicating dials 58 are arranged in a group of two dials and a group of five dials, the group of two dials being used to indicate the measurement in decimals of a foot and the group of five dials being used to measure the depth in feet thereby providing for extremely accurate measurement of the length of drill pipe and the depth of the well.

As the drill string is being made up the drill string at times will be supported in the slip bowl 24 by means of slips 59, 59 shown in dash-dot lines in FIG. 4 and when such slips 59 are in position retaining the string of drill pipe, the contact pin 23 is depressed by contact with a slip thereby opening the circuit between movable grounded contact 26 and contact 27 thereby releasing the electric clutch 37, 39. While contact pin 23 is depressed any upward or downward movement of the pulley block 12 in arranging the next section of drill pipe will have no effect on the indicator or counter. After the next section of drill pipe is securely connected to the depending drill string the entire drill string including the new section will be raised upwardly sufficient to release the slips 59 (the slips being then removed) thereby permitting the spring 25 to project contact pin 23 into the slip bowl closing the contacts 26 and 27 and thereby causing the clutch elements 37 and 39 to engage so that any movement thereafter of the pulley block 12 will be measured by the indicating dials 58 whether such motion is up or down. The upward motion will cause reduction in the total on the dials 58 and the downward motion will cause an increase in the readings of the dials 58 whereby a constant check is kept of the length of the string of drill pipe and thereby the depth of the well. It will be apparent that drill pipe sections are added to or removed from the well string as required at times for replacement of the cutter and/or for the increased depth of the well. The drill string is rotated in the usual manner by means of the kelly 17 and the square rotary bushing 22 which are in turn rotated by the rotary table 18 and the slip bowl 24.

Upon reference to FIGS. 7 to 11, inclusive, a derrick 110 is provided with a plurality of uprights 111 on one of which is mounted an elongated plate 112 which is held in place on the said one upright by suitable spacing elements and such plate carries a rack 113 with which a pinion 114 meshes. Such pinion 114 is mounted on a shaft 115 rotatably mounted in suitable bearings in a U-shaped slide or frame 116 having sides 117, 117′ and a connecting bight portion 118, the shaft 115 being mounted in bearings in the sides 117, 117′.

A plurality of rollers 119 (eight for example) are rotatably mounted on the sides 117, 117′ and engage the projecting edge portions of the plate 112 at spaced location along the plate maintaining the slide 116 in definite sliding relation along the plate 112 while maintaining the pinion 114 in meshing engagement with the rack 113.

A movable counter 120 is rigidly mounted by means of an extension of its housing and suitable bolts or the like on the slide 116. The movable counter 120 is provided with a counter operating shaft 121 having a magnetic friction clutch element 122 which is energized from a source of electricity by suitable slip rings or the like 123, 123′ to produce magnetic force to release the clutch by movement of clutch element 122 away from a clutch element 124 fixed to the pinion shaft 115 whereby when the circuit is closed to the slip rings 123, 123′, the clutch will be disengaged and motion of the pinion gear will not cause operation of the counter in either the forward or reverse direction.

To provide for easy reading of the counter, a stationary counter 125 is mounted on a fixed portion of the derrick and is connected by suitable wiring 125A mounted on a takeup reel 125B or the like and connected to the movable counter 120 whereby the motion in counter 120 is transferred to the stationary counter 125 and such means may be any one of the number of conventional types such as servo motors, the synchro relay systems, or a cam operated switch such as a switch shown at 126 in FIG. 5 which operates for each revolution of the hundredth indicator dial. A suitable type of device for obtaining the identical readings on both counters is the gyro repeaters used on ships to permit reading of the compass in many locations on the ship.

To assure that the slide 116 and counter 120 move at substantially the same rate and the same distance as the movable pulley block 127, a non-stretchable cord 128 is secured by one of its ends to the movable counter 120 on the slide 116 and by its other end to a movable pulley block 127. When the movable pulley block 127 is raising the drill string while the string is supported thereon, the conventional slips 132 are removed from the slip bowl and the friction clutch elements 122, 124 are maintained in driving engagement by means of the compression coil spring 129 reacting against the collar 30 on the counter operating shaft 121 urging the clutch element 122 into engagement with clutch element 124 on the pinion shaft 115 whereby the movement of the string up or down will subtractively or additively respectively register on the movable counter 120 and by the relay system also register on the counter 125.

When it is desired to add an additional length of pipe or tubing to the drill string 131, the kelly 17 is raised and the top length of pipe of the drill string 131 is held by the conventional wedge shaped slips 132 in the slip bowl 133 of the rotary bushing 134. At such time as the pipe string is held against vertical movement by slips 132 it is desired to release the clutch 122, 124. When the clutch is released movement of the pulley block 127 in mounting a new section of pipe on the string will not be indicated or counted.

A radio transmitter unit 135 is positioned within the slip bowl 133 and has a magnetic switch 136 which controls power from a battery 137 to a radio type oscillator transmitter 138, such structure being held in a non-magnetic stainless steel cylinder with insulation at each end and a suitable antenna 139 on the exterior of the upper end. The magnetic switch 136 responds to the presence of one or more slips 132 in slip bowl 133 thereby closing the circuit and energizing the radio oscillator 138 and transmitting a signal over its antenna 139. Such signal is received by the antenna 140 of an oscillator radio receiver 141 which may be carried on the slide 116 and which serves to energize a solenoid 142 of a relay which causes the armature 143 of the relay to complete a circuit through leads 144, 145 and a battery 146 or other source of power to thereby energize the magnetic clutch 122, 124 to cause such clutch to be disengaged. While the clutch is disengaged the movement of the pulley block 127 cannot be indicated on the counting devices 120 and 125. A brake 147 may engage the movable clutch element 122 to assure that no accidental movement can occur when the clutch is released. When the slips 132 are removed, the magnetic switch 136 opens automatically and the radio is rendered inoperative, and the clutch is caused to be engaged by the action of the spring 129 and movement of the pulley block 127 thereafter is transmitted to the counter in the manner previously described with respect to the other modifications.

It will thus be seen that applicant has provided a positive means and method for accurately measuring the length of the well string based on positive rotation between a pinion and rack between which no sliding can occur.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. A drill rig comprising a derrick, a fixed pulley block mounted on said derrick, a movable pulley block connected to said fixed pulley block by a cable, a gear rack pivotally suspended by its upper end from said derrick substantially parallel to the runs of said cable in between said fixed and movable pulley blocks, a pinion meshing with said rack, a pinion shaft fixed to said pinion, means supported and guided by said rack to maintain said pinion in operative relation to said rack, a clutch and register housing, means securing said clutch and register housing to said movable pulley block, a clutch and a register in said housing, said register having an operating shaft substantially in axial alignment with the axis of the movable pulley block and the pinion shaft, said pinion shaft projecting into said housing and being rotatably supported thereby, a clutch for positively connecting said register operating shaft and said pinion shaft in infinite angular positions and means to engage said clutch to measure the movement of said movable pulley block.

2. Apparatus for accurately measuring the length of a drill pipe while the drill pipe is being lowered into a drill bore comprising a rack gear mounted on a leg of a derrick, said rack including a plate projecting outwardly from near the edges of the teeth of the rack, a carriage having a plurality of wheels and mounted on said plate for movement thereon, a pinion gear rotatably mounted on said carriage and having a shaft projecting outwardly therefrom, means supporting and guiding the carriage on said rack to maintain said pinion gear in positive operative engagement with the teeth of said rack a counter mounted in alignment with said pinion shaft and having an operating shaft projecting therefrom, an electric magnetic clutch for connecting said pinion shaft and said counter operating shaft for causing driving movement of said operating shaft when the clutch is engaged, a movement transmitting flexible strand connected to said carriage and extending upwardly to the upper portion of the derrick and downwardly to the lower movable pulley block whereby motion of the lower movable pulley block causes identical motion of said carriage and counter, a radio transmitter and magnetic switch mounted in a non-magnetic housing and positioned in the rotary bushing, said radio transmitter and switch being mounted in the slip bowl with the magnetic operating means of the switch positioned for energization by the presence of the retaining slips in the slip bowl, said radio being energized at such time to project radiation from the slip bowl, a receiver positioned on said carriage for receiving radiation from said transmitter, said receiver serving to actuate a relay, said relay serving to energize the magnetic clutch to prevent operation of said counter when the slips are in clamping position in said slip bowl, and a stationary counter on a fixed support on the derrick, means interconnecting said stationary counter and said counter on said carriage by electrical connections for producing simultaneous rotation of said fixed counter to correspond with said movable counter whereby readings may be made selectively from the stationary counter and from the movable counter on the carriage.

3. In combination with a well drilling derrick in which the derrick includes a fixed and movable pulley with a supporting cable reeved therebetween and in which the movable pulley is provided with means for supporting a string of drill pipe, an elongated substantially straight rack gear mounted on said derrick, a carriage mounted for movement longitudinally on said rack, a pinion gear mounted on said carriage and meshing with the teeth of said rack whereby longitudinal movement of said carriage will cause rotation of said pinion gear, means supporting and guiding said carriage on said rack maintaining the teeth of said pinion in positive operative engagement with the teeth of said rack whereby any movement of said carriage along said rack causes rotation of said pinion gear, a counter mounted on said carriage, clutch means between said pinion gear and said counter for selectively connecting said counter to said pinion gear, positive interconnecting means between said movable pulley and said carriage whereby movement of said movable pulley results in equal movement of said carriage, slip bowl means to rotate said string of drill pipe, means in said slip bowl to support a string of drill pipe, and interconnecting means between said drill pipe rotating means and said clutch to cause said clutch to be disengaged when the drill string is supported by said slip bowl means, said interconnecting means serving to engage said clutch when the drill string is supported by said pulleys.

4. The invention according to claim 3 in which the carriage is fixedly mounted on the movable pulley and the rack is pivotally mounted for parallel swinging movement with respect to the cable reeved between said pulleys.

5. The invention according to claim 3 in which the rack is fixedly mounted on said derrick and comprising a non stretchable strand member positively interconnecting the carriage and the movable pulley.

6. The invention according to claim 3 in which the interconnecting means include radio control means for causing said clutch to be engaged and disengaged.

7. Well drilling equipment comprising a derrick, a stationary pulley rotatably mounted at the upper end thereof and a floor adjacent the lower end, a rack gear mounted on said derrick and extending a distance substantially the height thereof, a movable pulley, an elongated cable extending between said fixed and movable pulley for raising and lowering said movable pulley, a carriage mounted on said rack gear for movement therealong, a pinion gear rotatably mounted on said carriage and meshing with the rack gear whereby the pinion is rotated when the carriage is moved, means supporting and guiding said carriage on said rack for continuously maintaining the teeth of said pinion gear in meshing engagement with the teeth of said rack gear whereby any movement of said carriage along said rack will cause rotation of said pinion gear means drivingly connecting the carriage to the movable pulley, a counter mounted on said carriage, electrically operated clutch means releasably connecting the operating shaft of said counter to said pinion gear, whereby the counter will operate when the clutch is engaged and the pinion rotates, a slip bowl rotatably mounted on said floor for rotating a string of tubing, a transmission radio in said slip bowl responsive to the presence of the slips therein, whereby the radio transmits radio waves at a selected condition of the slip, and radio receiving means connected to the clutch between said operating shaft of said counter and said pinion whereby the said clutch will be selectively connected and disconnected to cause the counter to accurately measure the length of the tubing by adding increments and subtracting increments in accordance with the movement of the movable pulley when the string of tubing is connected thereto.

References Cited in the file of this patent
UNITED STATES PATENTS

| | | |
|---|---|---|
| 1,617,662 | Ackroyd | Feb. 15, 1927 |
| 1,863,007 | Elkins | June 14, 1932 |
| 1,870,362 | Hart | Aug. 9, 1932 |
| 1,993,877 | Dillon et al. | Mar. 12, 1935 |
| 2,076,246 | Nelson | Apr. 6, 1937 |
| 2,166,212 | Hayward | July 18, 1939 |
| 2,535,826 | Allenbaugh | Dec. 26, 1950 |
| 2,539,758 | Silverman et al. | Jan. 30, 1951 |
| 2,846,769 | Colont | Aug. 12, 1958 |
| 2,881,527 | Walter et al. | Apr. 14, 1959 |